(12) United States Patent  
Fushikida et al.

(10) Patent No.: US 9,440,570 B2  
(45) Date of Patent: Sep. 13, 2016

(54) VEHICLE SEAT

(71) Applicant: NHK SPRING CO., LTD., Yokohama-shi (JP)

(72) Inventors: Motohiro Fushikida, Yokohama (JP); Shinichi Kobayashi, Yokohama (JP); Tomo Ishibashi, Yokohama (JP); Masakazu Andou, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/407,033

(22) PCT Filed: May 22, 2013

(86) PCT No.: PCT/JP2013/064279  
§ 371 (c)(1),  
(2) Date: Dec. 10, 2014

(87) PCT Pub. No.: WO2013/187205  
PCT Pub. Date: Dec. 19, 2013

(65) Prior Publication Data  
US 2015/0183354 A1 Jul. 2, 2015

(30) Foreign Application Priority Data  
Jun. 11, 2012 (JP) .................................. 2012-132305

(51) Int. Cl.  
*B60N 2/68* (2006.01)

(52) U.S. Cl.  
CPC ................ *B60N 2/68* (2013.01); *B60N 2/682* (2013.01)

(58) Field of Classification Search  
CPC .................................................... B60N 2/682

USPC .......................................... 297/452.18, 452.2  
See application file for complete search history.

(56) References Cited

U.S. PATENT DOCUMENTS 4,492,408 A * 1/1985 Lohr ........................ B60N 2/00  
                                                                  248/424  
6,439,666 B1 * 8/2002 Kimura .................. B60N 2/015  
                                                      297/452.24

(Continued)

FOREIGN PATENT DOCUMENTS

| CN | 101778737 B | 2/2012 |
|----|-------------|--------|
| JP | 2010-82100 A | 4/2010 |
| JP | 2010-253242 A | 11/2010 |

OTHER PUBLICATIONS

Chinese Office Action issued Feb. 22, 2016 in corresponding Chinese Application No. 201380030399.1.

*Primary Examiner* — Adriana Figueroa  
(74) *Attorney, Agent, or Firm* — Knobbe Martens Olson & Bear LLP

(57) ABSTRACT

In a vehicle seat, beads are formed to a SC panel, and the beads extend along the seat front-rear direction adjacent to joint portions at seat width direction insides of the joint portions. When repeated load in the seat up-down direction is input to a seat width direction intermediate portion of the SC panel, for example, the SC panel is displaced by the input load in the seat up-down direction, and tensile load in the seat width direction acts on the beads as a result. The beads extend or contract in the seat width direction due to the tensile load. Load input to the SC panel is thereby absorbed by the extension and contraction of the beads, and load in the seat up-down direction input to the joint portions is reduced. This enables concentration of stress at the joint portions to be suppressed.

8 Claims, 4 Drawing Sheets

(56) References Cited

U.S. PATENT DOCUMENTS

| | | | | |
|---|---|---|---|---|
| 7,331,635 B2* | 2/2008 | Schwarz | ............... | B60N 2/5685 |
| | | | | 297/180.11 |
| 8,251,425 B2* | 8/2012 | Jungert | ................. | B60N 2/686 |
| | | | | 296/63 |
| 8,727,445 B2* | 5/2014 | De Maina | ............ | B60N 2/686 |
| | | | | 297/440.11 |
| 8,827,370 B2* | 9/2014 | Muhlenbrock | ........ | B60N 2/682 |
| | | | | 29/521 |
| 2003/0075968 A1* | 4/2003 | Gupta | ................. | B29C 49/4802 |
| | | | | 297/452.18 |
| 2007/0145807 A1* | 6/2007 | Gundall | ................. | B60N 2/062 |
| | | | | 297/452.18 |
| 2010/0141009 A1* | 6/2010 | Kirch | ..................... | B23K 20/10 |
| | | | | 297/452.18 |
| 2014/0084661 A1* | 3/2014 | Awata | ................... | B60N 2/5825 |
| | | | | 297/452.18 |
| 2014/0084662 A1* | 3/2014 | Zekavica | ................ | B60N 2/58 |
| | | | | 297/452.18 |

* cited by examiner

VEHICLE SEAT

CROSS-REFERENCE TO RELATED APPLICATIONS

This application is the U.S. National Phase under 35 U.S.C. §371 of International Application PCT/JP2013/064279, filed May 22, 2013, which claims priority to Japanese Patent Application No. 2012-132305, filed Jun. 11, 2012. The disclosures of the above-described applications are hereby incorporated by reference in their entirety. The International Application was published under PCT Article 21(2) in a language other than English.

TECHNICAL FIELD

The present invention relates to a vehicle seat.

BACKGROUND ART

In a vehicle seat described in Japanese Patent Application Laid-Open No. 2010-253242, a cushion frame forming a frame of a seat cushion is configured including a pair of side frames and a front panel.

The side frames extend along the seat front-rear direction, and the front panel spans across upper end portions of the pair of side frames. Generally both end portions in the seat width direction of the front panel are joined by welding or the like to the upper end portions of the side frames.

RELATED DOCUMENTS

Japanese Patent Application Laid-Open (JP-A) No. 2010-253242

SUMMARY OF INVENTION

Technical Subject

However, in cases in which both end portions in the seat width direction of the front panel are joined by welding or the like to the upper end portions of the side frames, stress concentrates at welded portions (joint portions) of the front panel and the side frames when repeated load in the seat up-down direction is input to the front panel, for example, such that there is a possibility of cracks developing at the welded portions (joint portions.

In consideration of the above circumstances, a subject of the present invention is to provide a vehicle seat capable of suppressing concentration of stress at a joint portion.

Solution to Subject

A vehicle seat according to a first aspect includes a first configuration member that configures a portion of a frame of the vehicle seat, a second configuration member that configures a portion of the frame of the vehicle seat, that is manufactured from sheet metal, and that includes a joint portion joined to the first configuration member at an outer peripheral portion of the second configuration member, a bead that is formed at the second configuration member, and that extends adjacent to the joint portion at an inside of the joint portion, and a contact portion being formed at the second configuration member, at a position at an inside in the seat width direction of the bead, and contacting the first configuration member.

In the vehicle seat according to the first aspect, the second configuration member is joined to the first configuration member at the outer peripheral portion thereof, and the joining portion configures the joint portion.

The bead is formed at the second configuration member, and the bead extends adjacent to the joint portion at the inside of the joint portion.

When repeated load in a thickness direction of the second configuration member is input to the second configuration member, for example, the second configuration member is displaced in the thickness direction due to the input load, and tensile load in a direction perpendicular to the bead extension direction acts on the bead. The bead is displaced by the tensile load so as to extend or contract along the perpendicular direction. The load input to the second configuration member is thereby absorbed by the extension and contraction of the bead, and the load input to the joint portion is reduced. This enables stress at the joint portion to be suppressed.

Moreover, a contact portion that contacts the first configuration member is formed at the second configuration member at a position at an inside in the seat width direction of the bead. When the bead is deformed so as to extend or contract, the contact portion can thereby slide on the first configuration member. This enables load input to the second configuration member to be used to slide the contact portion against the first configuration member. Namely, since energy input to the second configuration member by repeated load can be used as thermal energy caused by slide friction between the contact portion and the first configuration member, stress at the joint portions can be further reduced.

A vehicle seat according a second aspect is the vehicle seat according to the first aspect, wherein the joint portion is joined to the first configuration member by welding.

In the vehicle seat according to the second aspect, since the joint portion is joined to the first configuration member by welding, the first configuration member can be joined to the second configuration member using a simple configuration.

A vehicle seat according a third aspect is the vehicle seat according to the first aspect or the second aspect, wherein the second configuration member extends along the seat width direction, and the joint portions are disposed at both end portions in the seat width direction of the second configuration member, and the beads are disposed so as to overlap the entire joint portions along the seat width direction.

In the vehicle seat according to the third aspect, the second configuration member extends along the seat width direction, and the joint portions are disposed at both end portions in the seat width direction of the second configuration member. Moreover, the beads are disposed so as to overlap the entire joint portions along the seat width direction. Namely, each of the beads extends along the seat width direction inside of the respective joint portions so as to overlap the joint portions along the seat width direction. When repeated load in the thickness direction of the second configuration member is input to an intermediate portion in a length direction of the second configuration member, for example, the load input to the second configuration member is thereby absorbed across the entire joint portions due to the beads, enabling stress at the joint portions to be further reduced.

A vehicle seat according a fourth aspect is the vehicle seat according to any one of the first aspect to the third aspect, wherein the first configuration member is a pair of side frames that configures a frame of a seat cushion and extends along the seat front-rear direction, the second configuration member is a cushion panel that extends along the seat width direction spanning across upper end portions of the pair of side frames, and includes the joint portions at both end portions in the seat width direction, and the beads are formed running along the seat front-rear direction at inside in the seat width direction of the joint portions.

In the vehicle seat according to the fourth aspect, the first configuration member is a pair of side frames, and the side frames extend along the seat front-rear direction. Moreover, second configuration member is a cushion panel, and the cushion panel extends along the seat width direction. The cushion panel spans across the upper end portions of the pair of side frames, and is joined to the side frames at the locations of the joint portions at both end portions in the seat width direction.

The beads are formed to the cushion panel at inside in the seat width direction of the joint portions, and the beads respectively extends along the seat front-rear direction. When repeated load in the seat up-down direction is input at an intermediate portion in the seat width direction of the cushion panel, for example, the cushion panel is displaced in the seat up-down direction due to the input load, and tensile load in the seat width direction acts on the beads. The beads are respectively displaced so as to extend or contract along the seat width direction due to the tensile load. The load input to the cushion panel is thereby absorbed by the extension and contraction of the beads, and the load input to the joint portions is thereby reduced. This enables stress at the joint portions of the side frames and the cushion panel that mainly supports a seated occupant to be reduced.

A vehicle seat according to a fifth aspect is the vehicle seat according to the fourth aspect, wherein the cushion panel includes plural joint portions.

In the vehicle seat according to the fifth aspect, since the cushion panel includes plural joint portions, stress at the joint portions can be reduced while joining strength of the cushion panel with respect to the side frames is increased.

A vehicle seat according a seventh aspect is the vehicle seat according to the fourth aspect or the fifth aspect, wherein a flange that curves toward an inside in the seat width direction is formed at an upper end portion of each of the pair of side frames, placement recess portions, formed at both side portions in the seat width direction of the cushion panel, in a recessed shape, are placed above the flanges and protrude toward the seat lower side, and the joint portions are formed at an outer peripheral portion of each of the placement recess portions, and the beads project toward the seat upper side in the placement recess portions.

In the vehicle seat according to the seventh aspect, the flange is formed at the upper end portion of the pair of side frames, and the flange curves toward the seat width direction inside. The placement recess portions of the cushion panel are placed above the flanges, and the placement recess portions are formed in a recessed shape that protrude toward the seat lower side. The joint portions are formed at the outer peripheral portion of each of the placement recess portions, and the beads project toward the seat upper side in the placement recess portions. In cases in which the cushion panel is joined to the side frames by welding, for example, this enables the weld portions to be placed inside the placement recess portions as viewed from the seat front side.

A vehicle seat according to an eighth aspect is the vehicle seat according to the seventh aspect, wherein a notch that is open toward an outside in the seat width direction and toward the seat rear side in plan view is formed at the respective placement recess portions, and the joint portions are formed running along the notches.

In the vehicle seat according to the eighth aspect, since the joint portions are formed running along the notches formed at the placement recess portions, the joint portions can be placed inside the notches in plan view. In cases in which the cushion panel is joined to the side frames by welding, for example, this enables the weld portions to be disposed inside the notches.

Advantageous Effects of Invention

The vehicle seat according to the first aspect enables concentration of stress at the joint portion to be suppressed.

The vehicle seat according to the second aspect enables the first configuration member to be joined to the second configuration member using a simple configuration.

The vehicle seat according to the third aspect enables stress to be further reduced at the joint portion.

The vehicle seat according to the fourth aspect enables stress to be reduced at the joint portions of the side frames and the cushion panel that mainly supports a seated occupant.

The vehicle seat according to the fifth aspect enables stress at the joint portions to be reduced while increasing the joining strength of the cushion panel with respect to the side frames.

The vehicle seat according to the seventh aspect enables, in cases in which the cushion panel is joined to the side frames by welding, for example, the weld portions to be disposed inside the placement recess portions as viewed from the seat front side.

The vehicle seat according to the eighth aspect enables, in cases in which the cushion panel is joined to the side frames by welding, for example, the weld portions to be disposed inside the notches.

DESCRIPTION OF EMBODIMENTS

Figure 2:
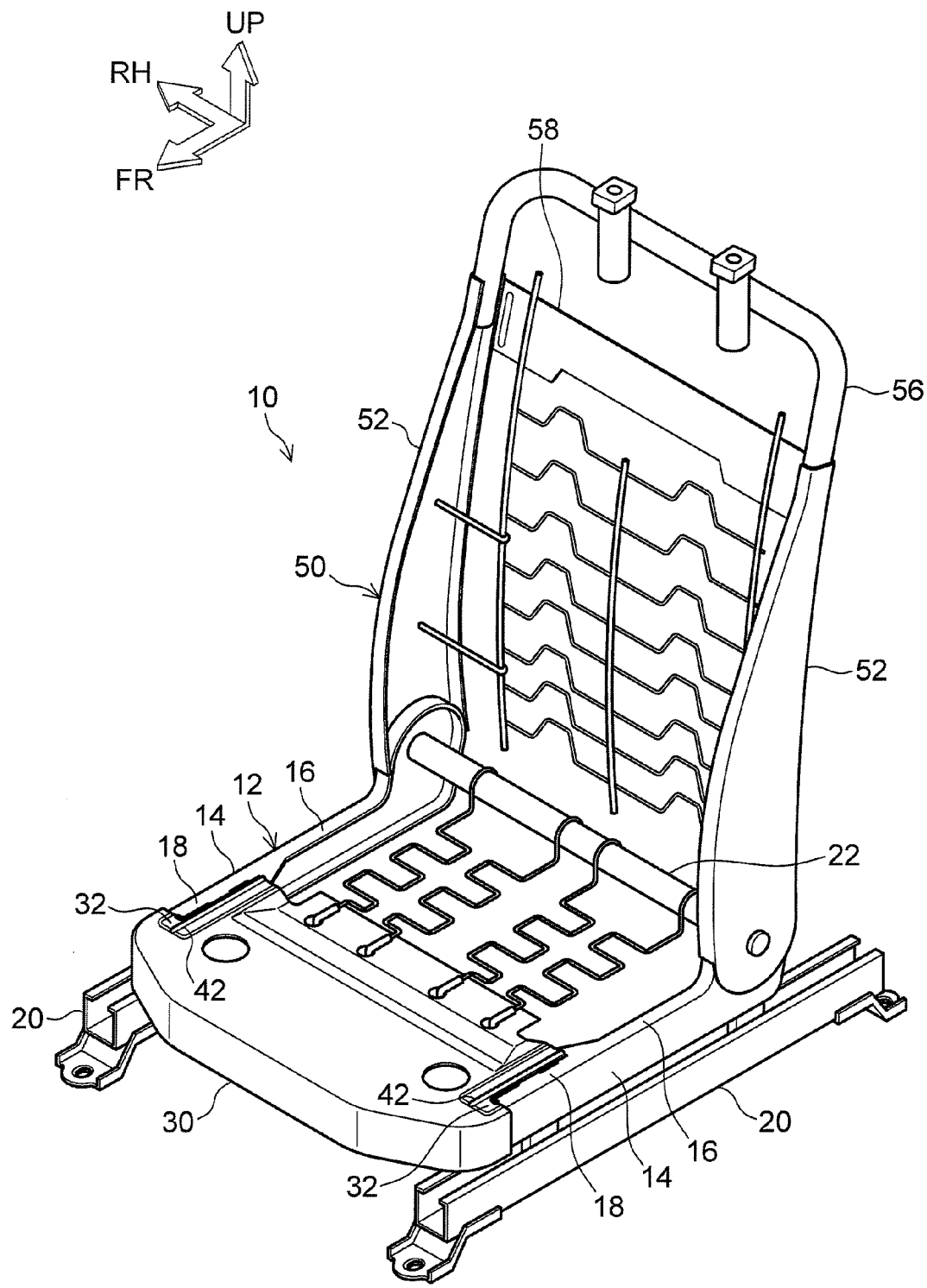
FIG. 2 is an overall perspective view illustrating the frame of the vehicle seat illustrated in FIG. 1.
Figure 3:
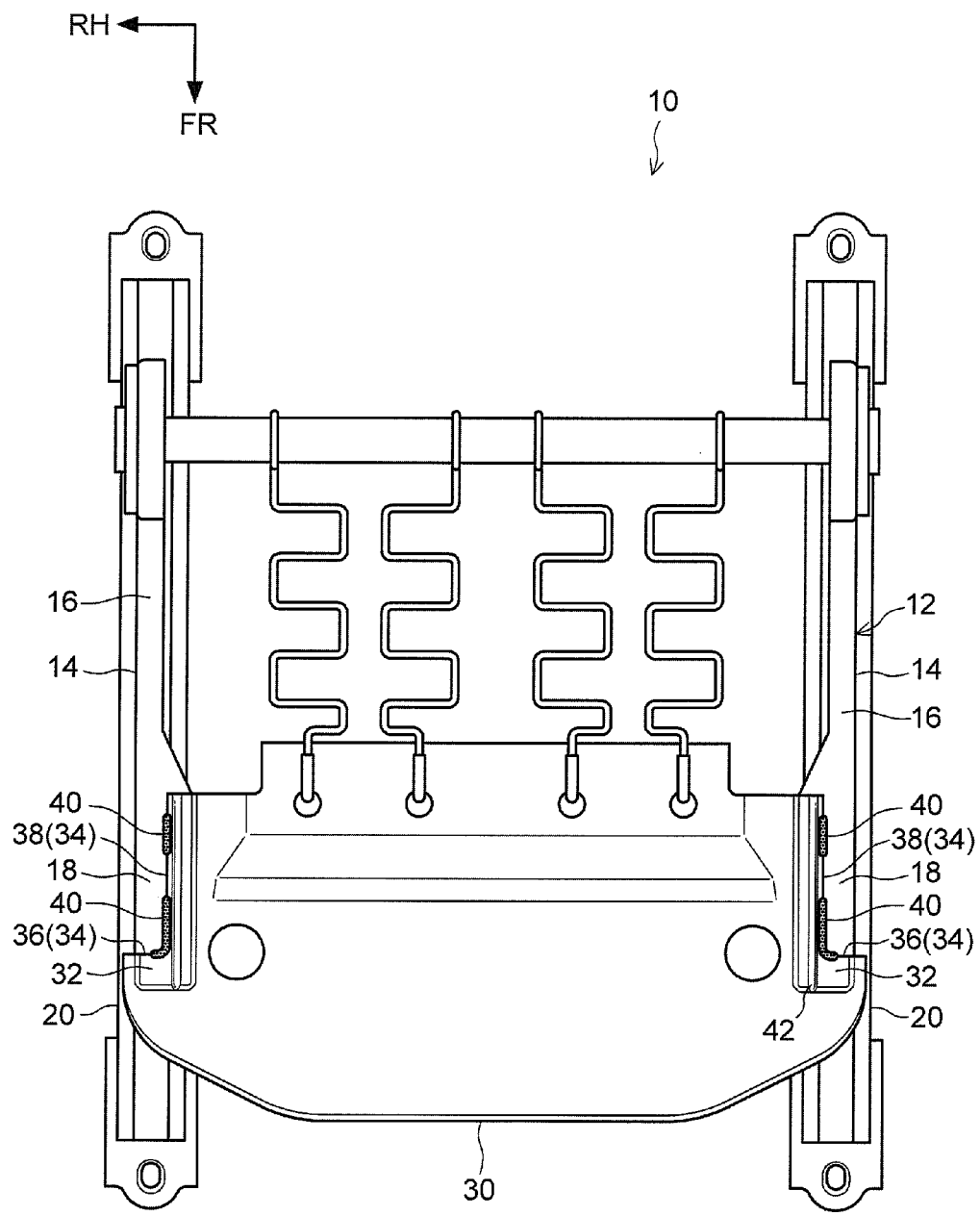
FIG. 3 is a plan view of the seat cushion frame illustrated in FIG. 2, viewed from above the seat.

FIG. 2 is a perspective view illustrating an entire frame of a vehicle seat 10 according to an exemplary embodiment of the present invention, viewed diagonally from the front left of the seat. Note that, in the drawings, the arrow FR indicates the seat front direction, the arrow UP indicates the seat upward direction, and the arrow RH indicates the seat right direction (one side in the seat width direction), as appropriate.

As illustrated in FIG. 2, the vehicle seat 10 is configured including a seat cushion frame 12 configuring a frame of a seat cushion for seating an occupant (not illustrated in the drawings), and a seatback frame 50 configuring a frame of a seatback for supporting the back of a seated occupant (not illustrated in the drawings).

The seat cushion frame 12 configures a lower portion of the vehicle seat 10, and is configured including a pair of seat cushion side frames (hereafter referred to as "SC side frames") 14 each serving as a "first configuration member" and a "side frame", and a seat cushion panel (hereafter referred to as "SC panel") 30 serving as a "second configuration member" and a "cushion panel".

The SC side frames 14 are respectively formed at both side portions in the seat width direction of the seat cushion frame 12. Each of the SC side frames 14, manufactured from sheet metal, extends along the seat front-rear direction with its plate thickness direction along the seat width direction. Conventionally known slide mechanisms 20 are provided to respective lower portions of the SC side frames 14, and the SC side frames 14 are coupled to the vehicle body floor (not illustrated in the drawings) by the slide mechanisms 20. A substantially pipe shaped coupling pipe 22 is provided between the pair of SC side frames 14 at seat rear side end portions thereof, and the pair of SC side frames 14 are coupled together by the coupling pipe 22.

Figure 4:
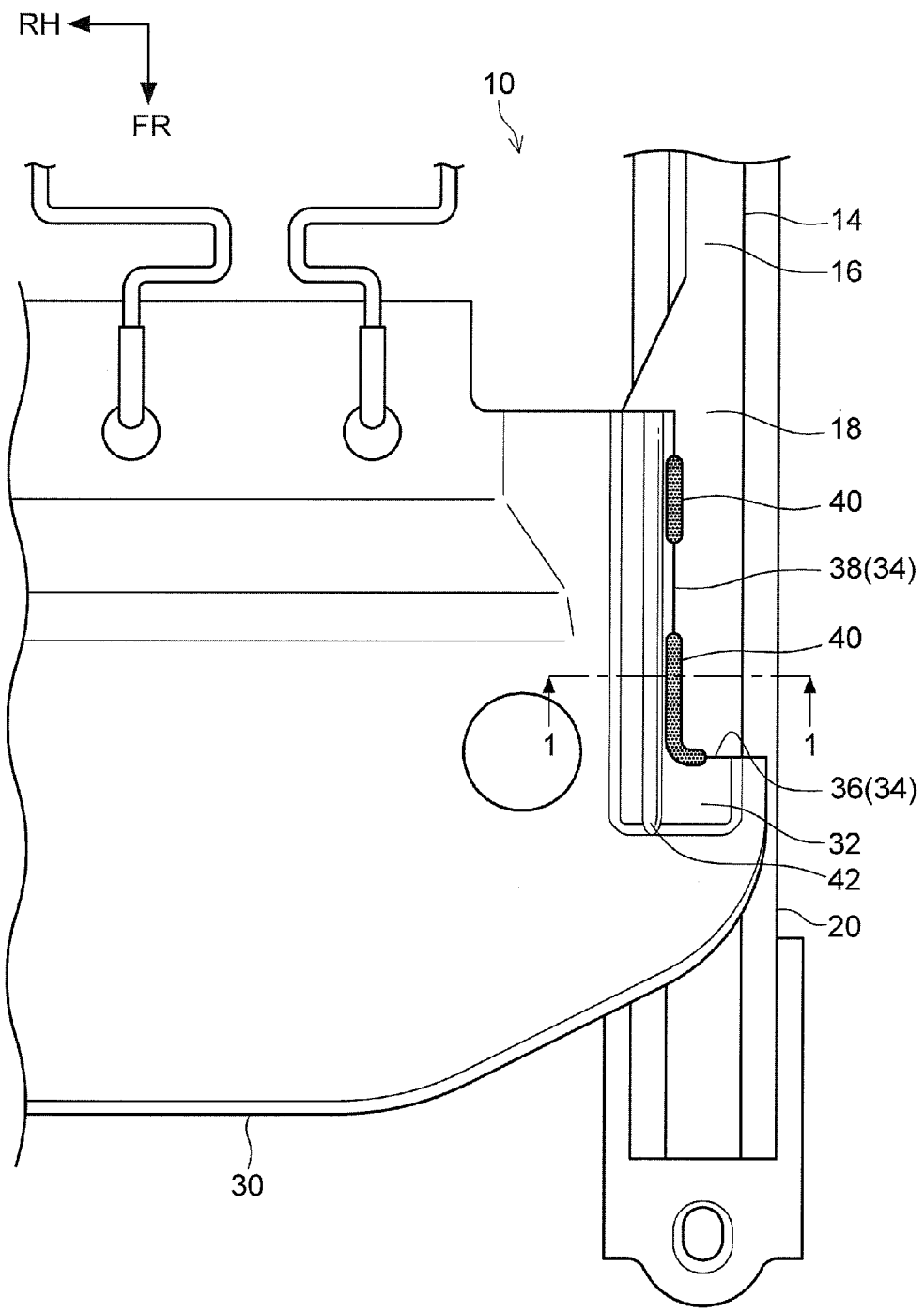
FIG. 4 is an enlarged plan view illustrating a joined state of the cushion panel and the side frame illustrated in FIG. 3, view from above the seat.

As illustrated in FIG. 2 and FIG. 4, a flange 16 is integrally provided at a seat upper side end portion of each of the SC side frames 14. The flange 16 curves to inside in the seat width direction, and is disposed running along a direction orthogonal to the seat up-down direction. A seat front side portion of each of the flanges 16 configures a welded portion 18, and the SC panel 30, described below, is joined to the welded portion 18 by welding.

The SC panel 30 is provided at a seat upper side portion of the seat cushion frame 12. The SC panel 30, manufactured from sheet metal, is formed in a substantially rectangular plate shape, and spans across the welded portions 18 of the pair of flanges 16 with its plate thickness direction in the seat up-down direction.

A placement recess 32 is provided at both end portions in the seat width direction of the SC panel 30. Each of the placement recesses 32 is formed in a recessed shape bulging toward the flange 16 side of the respective SC side frame 14 (the seat lower side), and is formed in a substantially rectangular shape in plan view. The placement recesses 32 are disposed on the respective welded portions 18 (flanges 16).

As illustrated in FIG. 4, a notch 34 is formed at an outer peripheral portion of the SC panel 30 at the position of the respective placement recess 32. Each of the notches 34 is open to the seat width direction outside and the seat rear side in plan view from the seat upper side, with a crosswise side 36 of the notch 34 disposed running along the seat width direction, and a lengthwise side 38 of the notch 34 disposed running along the seat front-rear direction.

The SC panel 30 is welded by arc welding to the welded portion 18 of the respective SC side frame 14 at two locations at each of the notches 34. Weld portions on the SC panel 30 to the SC side frames 14 thereby configure joint portions 40.

A bead 42 is formed at a position inside the respective placement recess 32 of the SC panel 30, and the bead 42 is adjacent to the joint portion 40 at an inside in the seat width direction. Each of the beads 42 protrudes from the respective placement recesses 32 toward the seat upper side, and is formed in a substantially inverted U shape, open toward the seat lower side in cross-section view viewed from the seat front side. The bead 42 extends along the seat front-rear direction (see FIG. 1), and is disposed at the seat width direction inside of the joint portion 40, parallel to the lengthwise side 38.

Each of the beads 42 extends along the seat front-rear direction so as to overlap the entire two locations of the joint portion 40 in the seat width direction. A portion contacting the flange 16 at a seat width direction inside portion of the bead 42 of the placement recess 32 configures a contact portion 44 (see FIG. 1).

As illustrated in FIG. 2, the seatback frame 50 is configured including a pair of seatback side frames (hereafter referred to as "SB side frames") 52, an upper pipe 56, and an upper panel 58.

The SB side frames 52 are provided at both sides in the seat width direction of the seatback frame 50. Each of the SB side frames 52 is manufactured from sheet metal and extends along the seat up-down direction with its thickness direction along the seat width direction. Seat lower side end portions of the SB side frames 52 are coupled to seat rear side end portions of the respective SC side frames 14 by a conventionally known reclining mechanism (not illustrated in the drawings).

The upper pipe 56 is manufactured from a pipe member and is formed in a substantial U shape open toward the seat lower side as viewed from the seat front side. Both end portions in a length direction of the upper pipe 56 are joined by welding or the like to respective seat upper side end portions of the SC side frames 14.

The upper panel 58 is provided at the seat rear side of an upper portion of the upper pipe 56. The upper panel 58 is manufactured from sheet metal and extends along the seat width direction with the plate thickness direction thereof in the seat front-rear direction. Both length direction end portions of the upper panel 58 are joined by arc welding to the upper pipe 56.

Explanation follows regarding operation and advantageous effects of the present exemplary embodiment.

In the vehicle seat 10 configured as described above, the SC panel 30 spans across the flanges 16 (welded portions 18) of the pair of SC side frames 14, and the SC panel 30 is joined by arc welding at the joint portions 40 in two locations on the respective flanges 16 (welded portions 18) of the SC side frames 14.

The beads 42 are formed to the SC panel 30, and the beads 42 extend along the seat front-rear direction adjacent to the respective joint portions 40 at the seat width direction insides of the joint portions 40.

Figure 1:
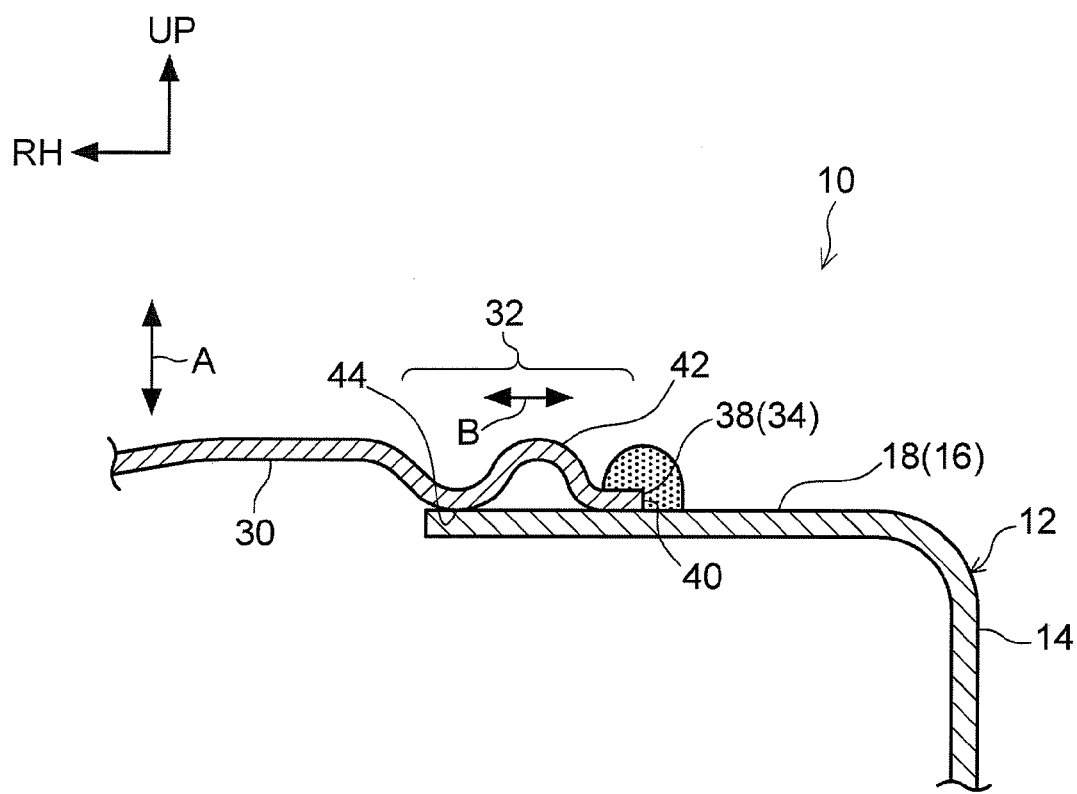
FIG. 1 is an enlarged cross-section view (a cross-section taken along line 1-1 in FIG. 4) illustrating a joined state of a seat cushion panel and a seat cushion side frame of a vehicle seat according to an exemplary embodiment of the present invention, viewed from the seat front side.

When repeated load in the seat up-down direction is input at a seat width direction intermediate portion of the SC panel 30, for example, the SC panel 30 is displaced in the seat up-down direction due to the input load (see the arrow A in FIG. 1). Tensile load acts on the beads 42 in the seat width direction (see the arrow B in FIG. 1) due to the displacement of the SC panel 30 in the seat up-down direction, and the beads 42 are displaced by the tensile load so as to extend or contract along the seat width direction. The load input to the SC panel 30 is thereby absorbed by the extension or contraction of the beads 42, and the load in the seat up-down direction input to the joint portions 40 is thereby reduced. Namely, this enables the load on the joint portions 40 in the weld separation direction to be reduced. This enables concentration of stress at the joint portions 40 to be suppressed.

Moreover, since the beads 42 are provided at the SC panel 30, stress can be reduced at the joint portions 40 joining the SC side frames 14 and the SC panel 30 that mainly supports a seated occupant.

The beads 42 are disposed so as to overlap the entire joint portions 40 along the seat width direction. Namely, the length of the beads 42 is set longer than the length of the joint portions 40 in the seat front-rear direction. The load input to the SC panel 30 is thereby absorbed across the whole of the joint portions 40 due to the beads 42, enabling stress at the joint portions 40 to be further reduced.

The SC panel 30 includes the respective joint portions 40 in two locations. This enables the stress at the joint portions 40 to be reduced, while increasing joining strength of the SC panel 30 with respect to the SC side frames 14.

The contact portions 44 are formed at the SC panel 30, and the contact portions 44 contact the respective flanges 16 of the SC side frames 14 at positions at insides in the seat width direction of the beads 42. This enables the contact portions 44 of the SC panel 30 to slide on the SC side frames 14 (flanges 16) when the beads 42 extend or contract in the seat width direction due to repeated load being input to the SC panel 30 in the seat up-down direction. This enables load input to the SC panel 30 to be used to slide the contact portions 44 against the SC side frames 14 (flanges 16). Namely, since energy input to the SC panel 30 from repeated load is used as thermal energy caused by sliding friction between the contact portions 44 and the SC side frames 14 (flanges 16), stress at the joint portions 40 can be further reduced. This enables concentration of stress at the joint portions 40 to be further reduced.

In the present exemplary embodiment, the beads 42 are formed to the SC panel 30. Instead of this, the beads 42 may be formed at the upper panel 58 of the seatback frame 50. Namely, the beads 42 may be formed at insides in the seat width direction of welded portions of the upper panel 58 and the upper pipe 56. In such a case, the upper pipe 56 is the "first configuration member" of the present invention, the upper panel 58 is the "second configuration member" of the present invention, and the welded portions of the upper panel 58 and the upper pipe 56 configure the joint portions 40.

In the present exemplary embodiment, the beads 42 are disposed so as to overlap the entire joint portions 40 in the seat front-rear direction. Instead of this, the beads 42 may be disposed so as to partially overlap the joint portions 40 in the seat front-rear direction.

In the present exemplary embodiment, the SC panel 30 includes the respective joint portions 40 at two locations; however a joint portion 40 may be set at one location on the SC panel 30, or joint portions 40 may be set at three or more locations on the SC panel 30.

In the present exemplary embodiment, the SC panel 30 is joined to the SC side frames 14 by arc welding at the locations of the joint portions 40. Instead of this, the notches 34 of the SC panel 30 may be omitted, and the SC panel 30 may be joined to the SC side frames 14 by spot welding at the inside of the edge portions of the SC panel 30. Or, the notches 34 of the SC panel 30 may be omitted, and the SC panel 30 may be joined to the SC side frames 14 using fastening members such as bolts and rivets at insides of edge portions of the SC panel 30.

In the present exemplary embodiment, the SC panel 30 is welded to the SC side frames 14 at the notches 34. Instead of this, the notches 34 of the SC panel 30 may be omitted, and holes formed instead at these portions, with the SC panel 30 welded to the SC side frames 14 at edge portions of the holes. Namely, "joint portions 40 joined to the SC side frames 14 at outer peripheral portions of the SC panel 30" in the present invention includes cases in which the joint portion 40 configures an edge portion of a hole, employed for fastening or welding, at an outer peripheral portion of the SC panel 30.

What is claimed is:

1. A vehicle seat comprising:
    a first configuration member configuring a portion of a frame of the vehicle seat;
    a flange being formed at the first configuration member, the flange curving toward and inside in a seat width direction;
    a second configuration member configuring a portion of the frame of the vehicle seat, being manufactured from sheet metal, and including a joint portion that is joined to the first configuration member at an outer peripheral portion of the second configuration member;
    a bead being formed at the second configuration member, and extending adjacent to the joint portion at an inside of the joint portion;
    a contact portion being formed at the second configuration member, at a position at an inside in the seat width direction of the bead, and contacting the first configuration member; and
    a placement recess portion, formed at the second configuration member, in a recessed shaped, is place above the flange and protrudes towards a seat lower side.

2. The vehicle seat of claim 1, wherein the joint portion is joined to the first configuration member by welding.

3. The vehicle seat of claim 1, wherein:
    the second configuration member extends along the seat width direction, and the joint portion is disposed at both end portions in the seat width direction of the second configuration member; and
    the bead is disposed so as to overlap each entire joint portion, respectively along the seat width direction.

4. The vehicle seat of claim 1, wherein:
    the first configuration member is a pair of side frames that configures a frame of a seat cushion and extends along a seat front-rear direction;
    the second configuration member is a cushion panel that extends along the seat width direction spanning across upper end portions of the pair of side frames, and includes the joint portion at both end portions in the seat width direction; and
    the bead is formed running along the seat front-rear direction at an inside in the seat width direction of each joint portion.

5. The vehicle seat of claim 4, wherein the cushion panel includes a plurality of joint portions.

6. The vehicle seat of claim 4, wherein:
    the flange is formed at an upper end portion of each of the pair of side frames,
    the placement recess portion is formed at both side portions in the seat width direction of the cushion panel, and
    each joint portion is formed at an outer peripheral portion of the placement recess portion, and each bead projects toward a seat upper side in the respective placement recess portion.

7. The vehicle seat of claim 6, wherein:
    a notch that is open toward an outside in the seat width direction and toward a seat rear side in plan view is formed at the respective placement recess portion; and
    each joint is formed running along the respective notch.

8. A frame of a vehicle seat, the frame comprising;
    a first configuration member having a flange curving toward an inside in a seat width direction; and a second configuration member having a joint portion, a placement recess portion, and a contact portion, the joint portion being disposed at an outer peripheral portion of the second configuration member and joining with the first configuration member, the placement recess portion being disposed above the flange when the second configuration member is joined with the first configuration member, the placement recess portion having a recessed shaped which protrudes towards a seat lower side and a bead, the bead extending adjacent to and inside the joint portion in the seat width direction, the contact portion being disposed inside the bead in the seat width direction and contacting the first configuration member when the second configuration member is joined with the first configuration member.

* * * * *